United States Patent [19]
Cai et al.

[11] Patent Number: 5,819,276
[45] Date of Patent: Oct. 6, 1998

[54] METHOD FOR SUPPORTING MULTIPLE FILE-SYSTEMS IN FILE INPUT/OUTPUT OPERATIONS

[75] Inventors: Jason Yaohua Cai, San Jose; Anthony Hassitt, Los Altos; Tsuneo Horiguchi, San Jose; Kimberly Marie Ketell, Milpitas; Marilyn Zupsich Smith, San Jose, all of Calif.

[73] Assignee: International Business Machines Corporation, Armonk, N.Y.

[21] Appl. No.: 590,685

[22] Filed: Oct. 6, 1995

[51] Int. Cl.⁶ .................................................... G06F 17/30
[52] U.S. Cl. ......................... 707/100; 707/101; 707/102; 707/1
[58] Field of Search ................... 395/601, 611, 395/701, 828, 200.01, 612, 708, 702, 705, 973; 707/100, 101, 102, 1, 10, 701, 702, 705, 973

[56] References Cited

U.S. PATENT DOCUMENTS

| | | | |
|---|---|---|---|
| 4,068,300 | 1/1978 | Bachman | 707/1 |
| 4,587,628 | 5/1986 | Archer et al. | 395/628 |
| 4,785,400 | 11/1988 | Kojima et al. | 707/100 |
| 5,295,222 | 3/1994 | Wadhwa et al. | 395/703 |
| 5,341,499 | 8/1994 | Doragh | 395/681 |
| 5,363,487 | 11/1994 | Willman et al. | 395/828 |
| 5,463,772 | 10/1995 | Thompson et al. | 345/433 |
| 5,574,898 | 11/1996 | LeBlang et al. | 707/1 |
| 5,574,903 | 11/1996 | Szymanski et al. | 707/1 |
| 5,603,034 | 2/1997 | Swanson | 395/701 |
| 5,640,550 | 6/1997 | Coker | 707/4 |

OTHER PUBLICATIONS

Larry L. Peterson and Herman C. Rao, "Accessing Files in an Internet: The Jade File System," Dept. of Computer Science, The University of Arizona, Tucson, Arizona, Jan. 24, 1991.

Herman Chung–Hwa Rao, "The Jade File System," Ph.D. Dissertation, Dept. of Computer Science, The University of Arizona, Tucson, Arizona, Aug. 15, 1991.

T.M. McBride and A.F. Snyder, "Data Sharing For Cooperative Processing in Heterogeneous Environment," *IBM Technical Disclosure Bulletin*, vol. 34, No. 6, Nov. 1991.

Wiebren de Jonge, M. Frans Kaashoek and Wilson C. Hsieh, "The Logical Disk: A New Approach to Improving File Systems," Association for Computing Machinery, 1993, pp. 15–28.

Herman C. Rao and Larry L. Peterson, "Accessing Files in an Internet: The Jade File System," *IEEE Transactions on Software Engineering*, vol. 19, No. 6, Jun. 1993, pp. 613–624.

*Primary Examiner*—Thomas G. Black
*Assistant Examiner*—Greta L. Robinson
*Attorney, Agent, or Firm*—Merchant, Gould, Smith, Edell, Welter, & Schmidt

[57] ABSTRACT

A method, apparatus, and article of manufacture for handling access to multiple file-systems from a program written in a high-level language such as COBOL, programming language compilers and run-time environments. More specifically, the present invention provides a computer-implemented method for supporting multiple file-systems in file input/output (I/O) operations. As a result, an object program has access to different file-systems without recompilation. Further, the interfaces within the source language are independent of the specified file-system, so that support of any number of different file-systems can be accomplished with relative ease. In addition, the ability to dynamically select a file-system on a file-by-file basis is provided, thereby allowing the program to use a first file-system for one file and a second file-system for another file.

39 Claims, 10 Drawing Sheets

FIG. 5

| I/O Address Vector | 44 | |
|---|---|---|
| Open | Entry | — 46 |
| Close | Entry | — 48 |
| Read | Entry | — 50 |
| Write | Entry | — 52 |
| Rewrite | Entry | — 54 |
| Start | Entry | — 56 |
| Delete | Entry | — 58 |

I/O Address Vector (after program initialization)

| | Generic | Open | Addr | Open | Entry | 46 |
|---|---|---|---|---|---|---|
| Close | Error | Routine | Addr | Close | Entry | 48 |
| Read | Error | Routine | Addr | Read | Entry | 50 |
| Write | Error | Routine | Addr | Write | Entry | 52 |
| Rewrite | Error | Routine | Addr | Rewrite | Entry | 54 |
| Start | Error | Routine | Addr | Start | Entry | 56 |
| Delete | Error | Routine | Addr | Delete | Entry | 58 |

I/O Address Vector (after the file has been OPENed)
(example is for a Sequential file
OPENed for input)

| Open Error Routine Addr | Open | Entry | 46 |
|---|---|---|---|
| Close Routine Addr | Close | Entry | 48 |
| Read Routine Addr | Read | Entry | 50 |
| Write Error Routine Addr | Write | Entry | 52 |
| Rewrite Error Routine Addr | Rewrite | Entry | 54 |
| Start Error Routine Addr | Start | Entry | 56 |
| Delete Error Routine Addr | Delete | Entry | 58 |

FIG. 9

44
\
I/O Address Vector (file is currently closed but)
has been OPENed previously)

| | | | | | | |
|---|---|---|---|---|---|---|
| | Open | Routine | Addr | Open | Entry | 46 |
| Close | Error | Routine | Addr | Close | Entry | 48 |
| Read | Error | Routine | Addr | Read | Entry | 50 |
| Write | Error | Routine | Addr | Write | Entry | 52 |
| Rewrite | Error | Routine | Addr | Rewrite | Entry | 54 |
| Start | Error | Routine | Addr | Start | Entry | 56 |
| Delete | Error | Routine | Addr | Delete | Entry | 58 |

METHOD FOR SUPPORTING MULTIPLE FILE-SYSTEMS IN FILE INPUT/OUTPUT OPERATIONS

BACKGROUND OF THE INVENTION

1. Field of the Invention.

The present invention relates generally to computer-implemented compilers for high-level programming languages and their associated run-time environments, and in particular, to a computer-implemented method for supporting multiple file-systems in file input/output (I/O) operations.

2. Description of the Related Art.

A compiler is a computer program that translates a source program into an equivalent object program that can be executed by a computer. The source program is typically comprised of high-level source language statements like COBOL, and the object language is the assembly language or machine code of some computer. The translation of the source program into the object program occurs at compile-time; the actual execution of the object program occurs at run-time.

A compiler must perform an analysis of the source program and then it must perform a synthesis of the object program, wherein it first decomposes the source program into its basic parts, and then builds the equivalent object program parts from the parts of the source program. As a source program is analyzed, information is obtained from declarations and procedural statements, such as loops and file I/O verbs.

Compilers for the COBOL programming language are well known in the art. In addition, run-time environments for COBOL-based computer programs are also well known in the art. The COBOL language has evolved into a standard language for business applications on mainframes and minicomputers, and has been adopted as such by the American National Standards Institute, Inc. (ANSI).

As a general rule, a file name is specified by COBOL source language statements using the "SELECT" and "ASSIGN" clauses. Such statements are specified using one of the following formats:

```
SELECT [OPTIONAL] FileId ASSIGN {TO literal}
SELECT [OPTIONAL] FileId ASSIGN {TO implementor-name}
SELECT [OPTIONAL] FileId ASSIGN {USING data-name}
``` wherein "FileId" represents the file identifier used within the source program to reference or identify input/output operations, and "implementor-name", "literal", and "data-name" represents the file identification as known by the computer system. The "implementor-name" may be a string representing the file identification or the name of an environment variable whose value is a string representing the file identification that may be set prior to object program execution. The "literal" is a string representing the file identification. The "data-name" is a variable containing a string representing the file identification at execution time.

In many computer platforms, multiple file-systems are available for use with application programs. Thus, it is important for a computer language product (such as COBOL) to support and provide an interface to these multiple file-systems. In such an environment, an application program should be able to access files of various different file-systems.

However, it is necessary to make the selection of a file-system as transparent as possible to the application program. Additionally, the support of access to multiple file-systems from programs written in a high-level programming language should be relatively easy to implement.

In order to address the above requirements, the present invention provides a method for supporting multiple file-systems for high-level language (such as COBOL) file input/output (I/O) operations.

SUMMARY OF THE INVENTION

To address the requirements described above, the present invention discloses a method, apparatus, and article of manufacture for supporting file input/output (I/O) operations to multiple file-systems through applications written in a high-level computer language, such as COBOL.

In the present invention, the source program may include a literal identifying the specific file-system. Alternatively, the source program may use a data name or variable to store a string representation of the file-system identifier that is constructed or specified by the source program, or retrieved from an external source. In addition, an environment variable that stores a string representation of the file-system identifier may be specified at object program run-time. These capabilities are provided by extensions to standard programming language conventions that are recognized and processed within a compiler.

An object of the present invention is to allow different file-systems to be specified in source language statements. Another object of the present invention is to permit an object program to access different file-systems without recompilation, using data names or environment variables. Yet another object of the present invention is to make the interfaces within the source language independent of the specified file-system, so that support of any number of different file-systems can be accomplished with relative ease. Still another object of the present invention is to provide the ability to dynamically select a file-system on a file-by-file basis, thereby allowing the program to use a first file-system for one file and a second file-system for another file.

BRIEF DESCRIPTION OF THE DRAWINGS

Referring now to the drawings in which like reference numbers represent corresponding parts throughout:

FIG. 5 is a block diagram that illustrates the structure of the I/O address vector;

FIG. 7 is a block diagram that illustrates the structure of the I/O address vector, which shows the entries for an I/O address vector after the object program has initialized, but before an OPEN operation has been performed for the associated file;

FIG. 8 is a block diagram that illustrates the structure of the I/O address vector, which shows the entries for an I/O address vector after the object program has performed the OPEN function for the associated file, wherein the file is opened for input only;

FIG. 9 is a block diagram that illustrates the structure of the I/O address vector, which shows the entries for an I/O address vector after a CLOSE operation has been performed, but the file has been OPENed previously at least once.

DETAILED DESCRIPTION OF THE PREFERRED EMBODIMENT

In the following description, reference is made to the accompanying drawings which form a part hereof, and in which is shown by way of illustration embodiments of the invention. It is understood that other embodiments may be utilized and structural changes may be made without departing from the scope of the present invention.

HARDWARE ENVIRONMENT

Figure 1:
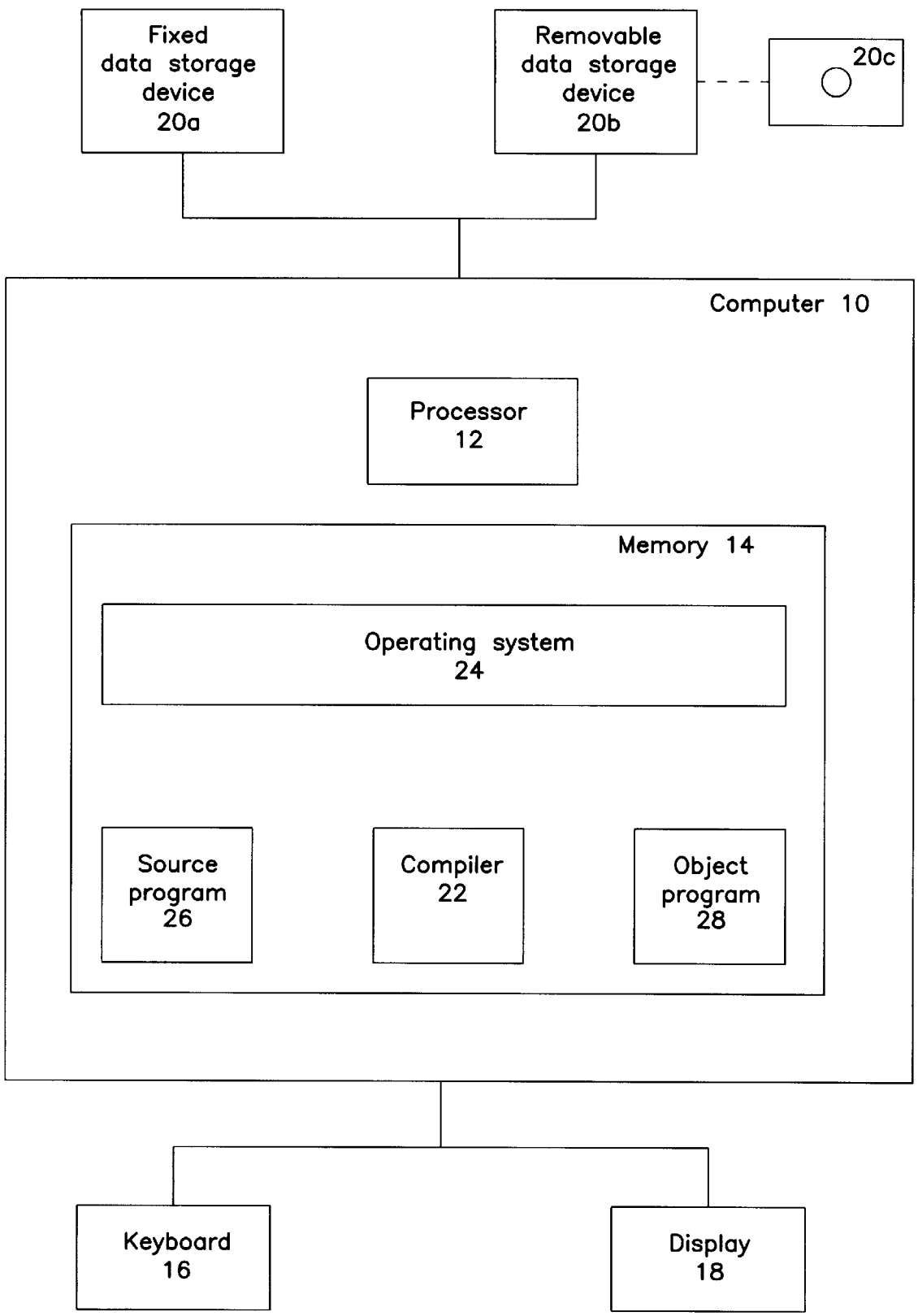
FIG. 1 is a block diagram illustrating an exemplary hardware environment used to implement the preferred embodiment of the invention.

FIG. 1 is a block diagram illustrating an exemplary hardware environment used to implement the preferred embodiment of the invention. In the exemplary hardware environment, a computer 10 may include, inter alia, a processor 12, memory 14, keyboard 16, display 18, as well as fixed and/or removable data storage devices and their associated media 20a, 20b, and 20c. Those skilled in the art will recognize that any combination of the above components, or any number of different components, peripherals, and other devices, may be used with the computer 10.

The present invention is generally implemented using a compiler program 22 executed under the control of an operating system 24, such as OS/2™, Windows™, AIX™, UNIX™, DOS™, etc. In the preferred embodiment, the compiler 22 conforms to ANSI COBOL language conventions, although those skilled in the art will recognize that the compiler 22 could also conform to other language conventions without departing from the scope of the present invention.

The compiler 22 performs an analysis of a source program 26 containing source language statements, wherein the source program 26 is generally stored in a text file on the data storage devices 20a–c or entered interactively by a programmer from the keyboard 16. The compiler 22 then synthesizes an object program 28 from the source language statements in the source program 26.

Using extensions built into standard language conventions according to the present invention, a programmer can enter source language statements into the source program 26 that specify a particular type of file-system (such as BTRIEVE, VSAM, etc.) to use for input and output operations. These source language extensions, when recognized by the compiler 22, result in the generation of an object program 28 containing instructions for performing the input and output operations according to the selection of the file-system.

Figure 2:
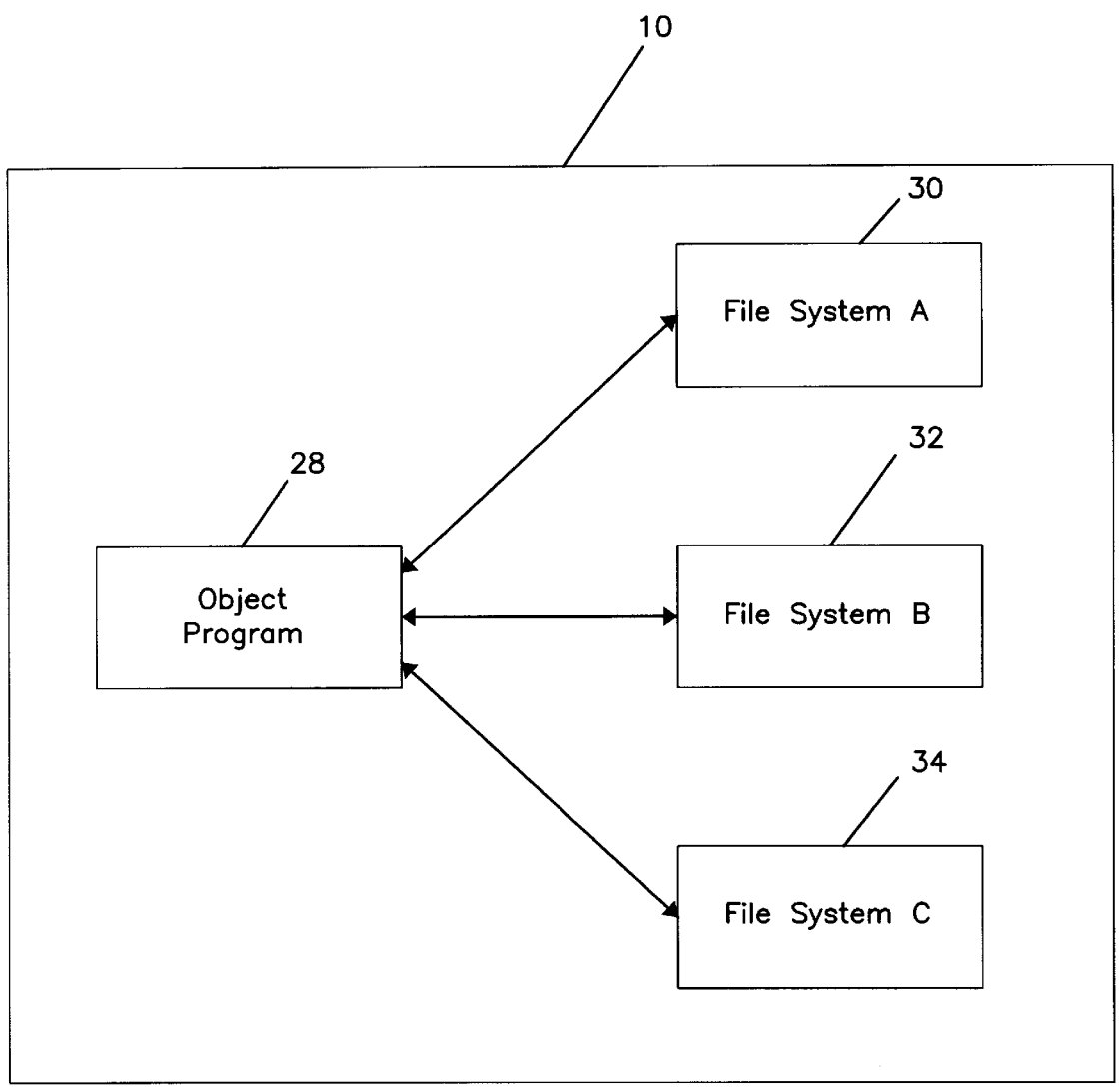
FIG. 2 is a block diagram that illustrates the interaction in the computer between the object program and multiple file-systems.

FIG. 2 is a block diagram that illustrates the interaction between the object program 28 and multiple file-systems 30, 32, and 34. Those skilled in the art will recognize that the file-systems 30, 32, or 34 may be implemented in a number of different ways. For example, the file-system may be implemented as illustrated in FIG. 2, wherein each file-system 30, 32, and 34 is a separate program executed under control of the operating system 24, and the object program 28 communicates with the separate programs 30, 32, and 34 using some protocol. In another embodiment, the file-system may be implemented via a library of routines (not shown) that are linked or bound to the object program 28. In yet another embodiment, the file-system may be implemented via extensions to the operating system 24 itself that are invoked by the object program 28. Those skilled in the art will recognize that these and other implementations of the file-system could be used without departing from the scope of the present invention.

Those skilled in the art will also recognize that the input and output operations performed by the object program 28 may be accomplished in a number of different ways. For example, in one embodiment, the compiler 22 may actually include instructions into the object program 28 that link and/or bind the file-system to the object program 28. In another embodiment, the compiler 22 may insert desired routines from the file-system into the object program 28. In yet another embodiment, the compiler 22 may add instructions for communicating with a file-system executed as a separate program into the object program 28. Those skilled in the art will recognize that these and other implementations of the object program 28 could be used without departing from the scope of the present invention.

Figure 3:
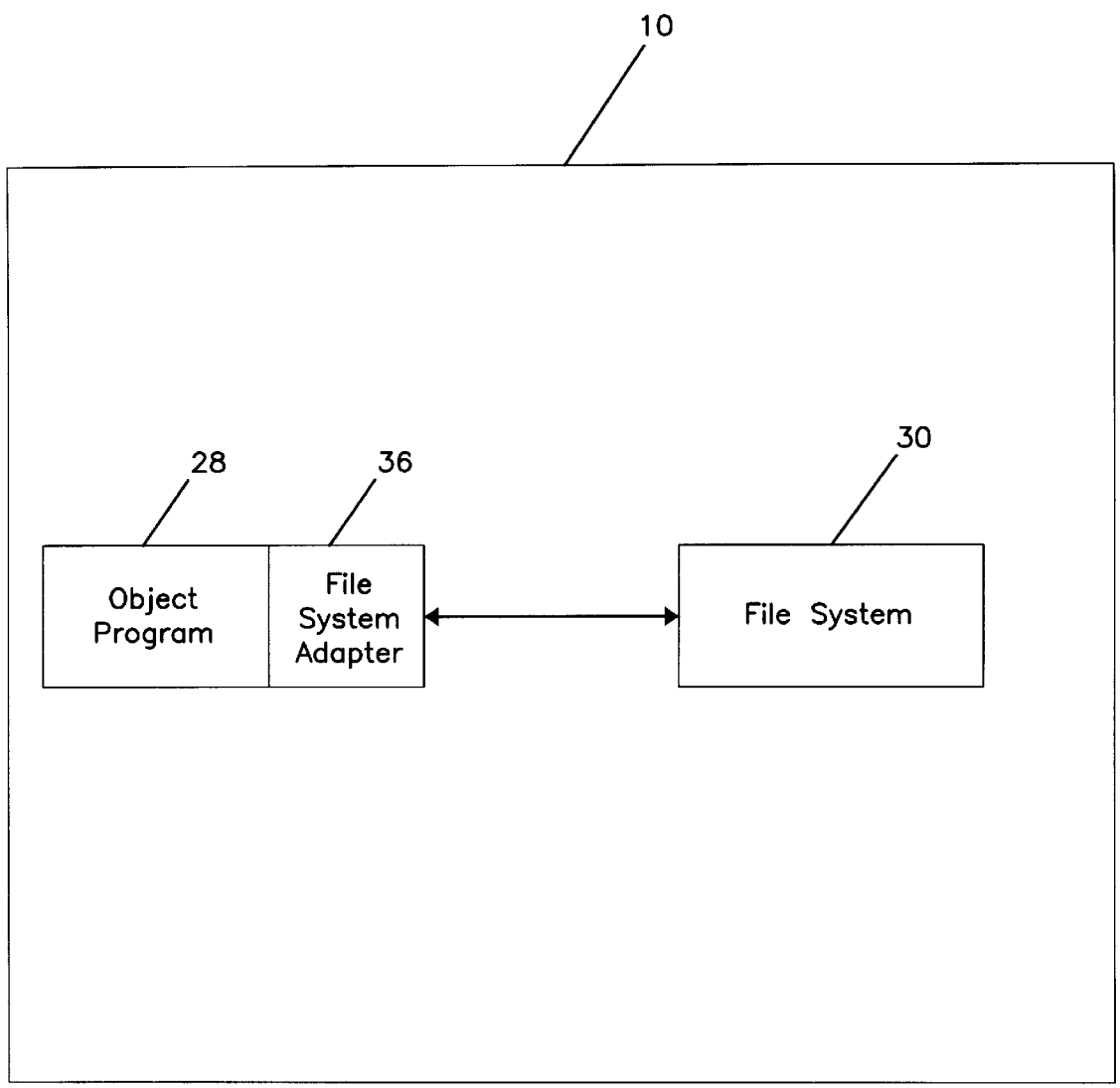
FIG. 3 is a block diagram that illustrates an alternative embodiment of the present invention, wherein a file-system adapter is used to interface the object program to the desired file-system.

FIG. 3 is a block diagram that illustrates an alternative embodiment of the present invention, wherein a file-system adapter 36 is used to interface the object program 28 to the desired file-system 30. In this embodiment, the compiler 22 may add instructions for interfacing to the file-system adapter 36 into the object program 28, wherein the file-system adapter 36 comprises a run-time interface between the object program 28 and the file-system 30, and is activated or executed when the object program 28 is executed. The file-system adapter 36 is a loadable object program or library that contains all of the routines required by the object program 28 for interfacing to the file-system 30. The appropriate file-system adapter 36 is dynamically loaded during the run-time of the object program 28 based on the selected file-system 30.

Generally, the compiler 22, operating system 24, source program 26, object program 28, file-systems 30, 32, 34, and file-system adapter 36 are all tangibly embodied in a computer-readable medium, e.g., one or more of the fixed and/or removable data storage devices and their associated media 20a–c. Moreover, the compiler 22, operating system 24, object program 28, file-systems 30, 32, 34, and file-system adapter 36 are all comprised instructions which, when read and executed by the computer 10, causes the computer 10 to perform the steps necessary to implement and/or use the present invention. Under control of the operating system 24, the compiler 22, object program 28, file-systems 30, 32, 34, and file-system adapter 36 may be loaded from the data storage device 20a–c into the memory 14 of the computer 10 for use during actual operations.

COMPILATION

Figure 4:
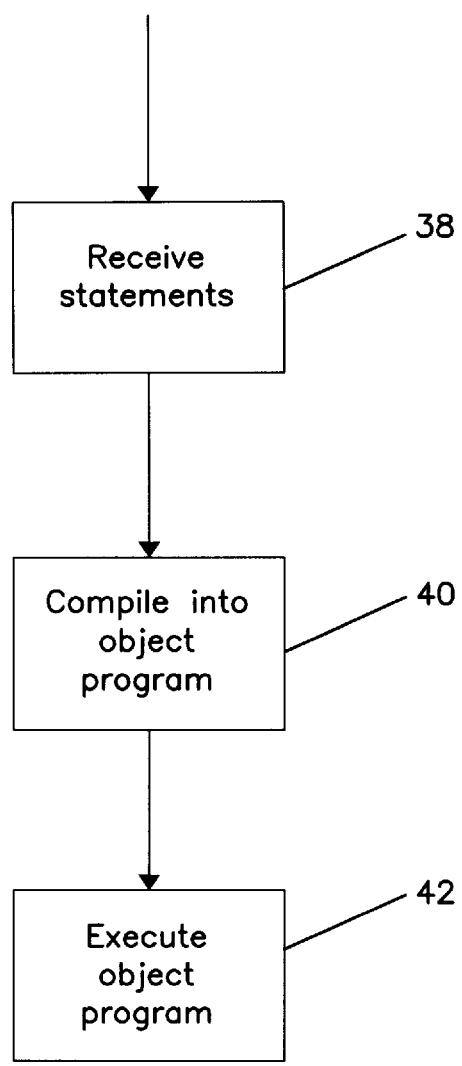
FIG. 4 is a flowchart illustrating the general flow performed for the preparation and execution of a program to accomplish the present invention.

FIG. 4 is a flowchart illustrating the general flow performed for the preparation and execution of a program to accomplish the present invention. Block 38 represents the compiler 22 receiving source language statements comprising a source program 26 into the memory 14 of the computer 10, wherein at least one of the statements comprises a selection of a file-system 30, 32, or 34 for performing input and output operations. Following block 38, block 40 represents the compiler 22 translating the source program 26 into an object program 28 in the memory of the computer 10, wherein the object program 28 includes instructions for performing the input and output operations according to the selection of the file-system 30, 32, or 34. Following block 40, block 42 represents the object program 28 being executed in the memory 14 of the computer 10.

Within the source program 26, the selection of a file-system 30, 32, or 34 for a file is identified by a source language statement that includes the "SELECT" and "ASSIGN" clauses in accordance with standard ANSI COBOL language conventions. For example, under standard ANSI COBOL language conventions, the following source language statements are used to define and access a file:

```
"SELECT FileId ASSIGN TO FileName
OPEN FileId
READ FileId . . .
CLOSE FileId"
```

In the above statements, the "SELECT" and "ASSIGN" clauses introduce a file definition, wherein the "FileId" represents the file identifier used within the source program 26 to reference or identify input/output operations, and the "FileName" represents the file name of the desired file or device. The file name may be a literal identifying the specific file. Alternatively, the file name may be a data name or variable that is used to store a string representation of the file name that is constructed or specified by the source program 26 or retrieved from an external source. In addition, the file name may be an environment variable that stores a string representation of the file name that is specified at object program 28 run-time.

The "OPEN" verb introduces a file open operation, setting up the object program 28 to begin input/output operations against the identified file or device. The "WRITE" verb introduces a write or output operation, allowing the object program 28 to write data to the identified file or device. The "READ" verb introduces a read or input operation, allowing the object program 28 to read data from the identified file or device. The "CLOSE" verb introduces a close operation, terminating access and input/output operations by the object program 28 for the identified file or device.

The present invention includes extensions to the rules of ANSI COBOL regarding the use of the "SELECT" and "ASSIGN" clauses, in order to accomplish the objects of the present invention. These extensions to the "SELECT" and "ASSIGN" clauses allow a programmer to specify a file system 30, 32, or 34 to be used in performing input/output operations against the identified file. For example, the following source language statement may be entered into the source program 26 according to the present invention:

"SELECT FileID ASSIGN TO FileSystemId-FileName"

wherein "FileSystemId" is a file-system identifier, such as VSAM, SFS, BTRIEVE, C-ISAM, or other file-system. The file-system identifier may be in either a literal or non-literal form.

In a literal form, the file-system identifier comprises a character string corresponding to the file-system, such as the strings "VSAM", or "SFS", or "BTRIEVE" or "C-ISAM", or some other string recognizable to the compiler 22. Upon recognition of the file-system identifier, the compiler 22 responds by generating the correct instruction sequences in the object program 28 to provide the necessary support for the selected file-system 30, 32, or 34 in the object program 28.

In a non-literal form, the file-system identifier comprises a data name or environment variable. A data name comprises a program variable that stores a character string representation of the file-system identifier that is constructed or specified by the source program 26, or retrieved from an external source. The contents of the data name are analyzed and acted upon when an OPEN operation is performed by the object program 28.

An environment variable also comprises an operating system variable that stores a character string representation of the file-system identifier. Unlike data names, however, environment variables are specified at object program 28 run-time as a startup parameter or switch, and are passed into the object program 28 by the operating system 24. Like data names, the contents of the environment variable are analyzed and acted upon when an OPEN operation is performed by the object program 28.

If the file-system identifier is specified explicitly via a data name or an environment variable, then that specification for the file-system identifier overrides any specification made with the "ASSIGN" directive.

I/O ADDRESS VECTOR

In the present invention, the ability to access different file-systems 30, 32, and 34 is accomplished by the compiler 22 including a data structure into the object program 28 for each defined file. The data structure comprises a list of addresses known as an I/O address vector that points to routines for performing the input/output operations for each defined file.

FIG. 5 is a block diagram that illustrates the structure of the I/O address vector 44. The I/O address vector 44 comprises a list of addresses 46, 48, 50, 52, 54, and 56, wherein each of the addresses 46, 48, 50, 52, 54, and 56 represents a routine that performs the input and output operations associated with a verb in the source program 26. More specifically, the I/O address vector 44 comprises a plurality of entries 46, 48, 50, 52, 54, and 56 for storing addresses for an OPEN routine, CLOSE routine, READ routine, WRITE routine, REWRITE routine, START routine, and DELETE routine, respectively.

Figure 6:
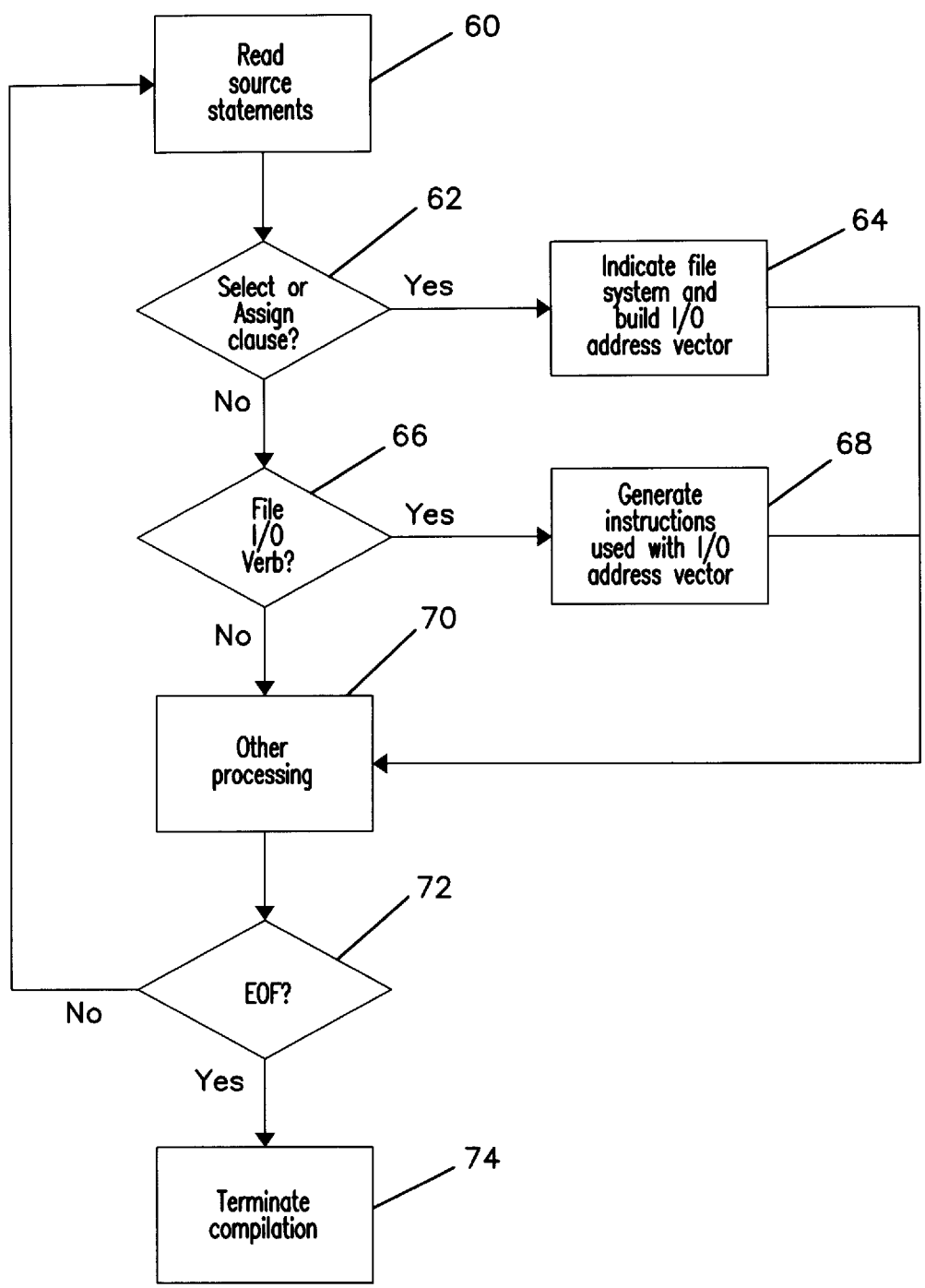
FIG. 6 is a flowchart illustrating the specific logic performed during the compilation process to generate the I/O address vector.

FIG. 6 is a flowchart illustrating the specific logic performed during the compilation process to handle file I/O statements. Block 60 represents the compiler 22 reading the source language statements from the source program 26. Following block 60, block 62 is a decision block that represents the compiler 22 determining whether a SELECT/ASSIGN clause is being processed. If so, then control transfers to block 64; otherwise, control transfers to block 66. Block 64 represents the compiler 22 identifying and indicating the file-system specified (if any) and building the I/O address vector 44 for the file. Following block 64, control transfers to block 70.

Block 66 is a decision block that represents the compiler 22 determining whether an I/O verb (OPEN, CLOSE, READ, WRITE, etc.) is present in the statement. If so, then control transfers to block 68; otherwise, control transfers to block 70. Block 68 represents the compiler 22 generating instructions to transfer control to the I/O verb processing routine using the I/O address vector 44 of the file. Following block 68, control transfers to block 70.

Block 70 represents other processing by the compiler 22, i.e., the compiler 22 performing the other functions involved in the compilation process, as is well known in the art. Thereafter, control transfers to block 72, which is a decision block that represents the compiler 22 determining whether an end-of-file (EOF) has occurred during the reading of the source language statement from the source program 26. If so, then control transfers to block 74, which represents the compiler 22 terminating its functions. Otherwise, control transfers to block 60, which represents the compiler 22 reading the next source language statement from the source program 26.

Although the I/O address vector 44 is created and initialized when the object program 28 is executed, the addresses 46, 48, 50, 52, 54, and 56 in the I/O address vector 44 change depending on the state of execution in the object program 28. These changes to the addresses 46, 48, 50, 52, 54, and 56 by the object program 28 ensure that the correct routines are invoked for handling the input/output operations according to the specified file-system.

For example, FIG. 7 is a block diagram that illustrates the structure of the I/O address vector 44, which shows the entries 46, 48, 50, 52, 54, and 56 for an I/O address vector 44 after the object program 28 has been initialized, but before an OPEN operation has been performed for the associated file. The entries 46, 48, 50, 52, 54, and 56 in the I/O address vector 44 comprise addresses for a generic OPEN routine, a CLOSE error handling routine, a READ error handling routine, a WRITE error handling routine, a REWRITE error handling routine, a START error handling routine, and a DELETE error handling routine, respectively. In this example, any attempt to perform any function other than an OPEN function will result in error handling, because an OPEN has not yet been performed. The error handling routines addressed in the I/O address vector 44 handle events such as trying to CLOSE a file that has not been OPENed.

FIG. 8 is a block diagram that illustrates the structure of the I/O address vector 44, which shows the entries 46, 48, 50, 52, 54, and 56 for an I/O address vector 44 after the object program 28 has performed the OPEN function for the specific file-system, wherein the sequential file is opened for input only. The I/O address vector 44 comprises addresses 46, 48, 50, 52, 54, and 56 for an OPEN error handling routine, a CLOSE routine, a READ routine, a WRITE error handling routine, a REWRITE error handling routine, a START error handling routine, and a DELETE error handling routine, respectively. In this example, the CLOSE entry 48 and READ entry 50 in the I/O address vector 44 point to the CLOSE and READ routines for the specified file-system. Further, any attempt to perform any function other than a CLOSE or READ function will result in error handling, because the file was a sequential OPENed file for input only. In addition, the OPEN slot 46 in the I/O address vector 44 is filled in with the address of the OPEN error handling routine, since it is a logic error to try to open a file that is already open.

FIG. 9 is a block diagram that illustrates the structure of the I/O address vector 44, which shows the entries 46, 48, 50, 52, 54, and 56 for an I/O address vector 44 after a CLOSE operation has been performed, but the file has been OPENed previously. The I/O address vector 44 comprises addresses 46, 48, 50, 52, 54, 56, and 58 for the specific OPEN routine for the specified file-system, a CLOSE error handling routine, a READ error handling routine, a WRITE error handling routine, a REWRITE error handling routine, a START error handling routine, and a DELETE error handling routine, respectively. In this example, any attempt to perform any function other than the OPEN function for the specified file-system will result in error handling.

The above examples are provided for illustrative purposes only and the contents of the I/O address vector 44 may change depending on the functions performed against the specified file, and the state of the object program 28.

The addresses 46, 48, 50, 52, 54, and 56 in the I/O address vector 44 may comprise addresses for routines in object libraries that perform the desired operations themselves, or the addresses 46, 48, 50, 52, 54, and 56 in the I/O address vector 44 may comprise addresses for routines that communicate with other object programs or libraries that perform the desired operations. The flexibility of this approach is that the addresses 46, 48, 50, 52, 54, and 56 can be filled in during run-time without any changes to source 26 or to the object program 28. At the same time, the object program 28 can use any number of different file-systems for input/output operations.

EXECUTION

Figure 10:
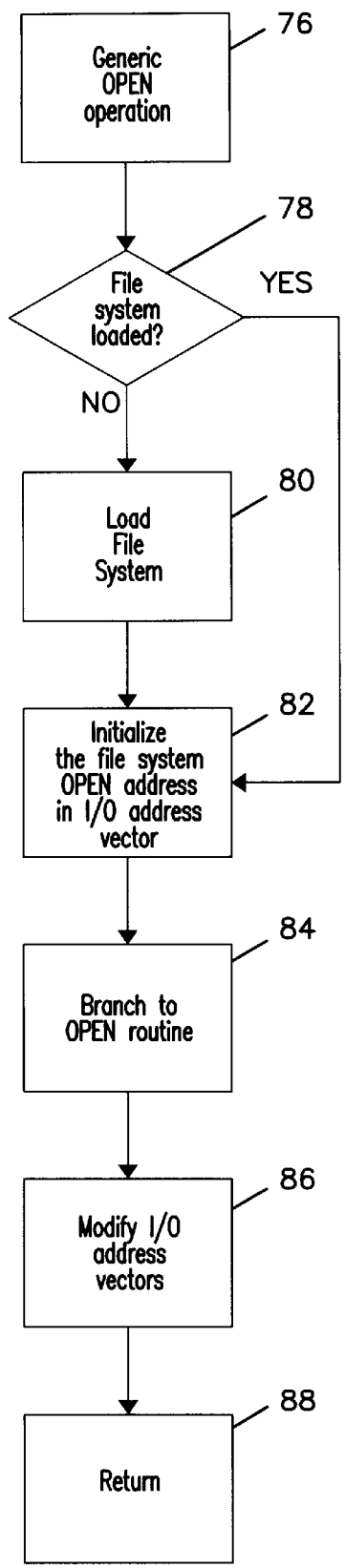
FIG. 10 is a flowchart illustrating the logic performed by the object program that corresponds to the generic OPEN routine that is invoked via a branch to the address in the first entry of the I/O address vector.

FIG. 10 is a flowchart illustrating the logic performed by the object program 28 for the generic OPEN function that is addressed via a branch to location specified in the first entry 46 in the I/O address vector 44. As mentioned earlier, FIG. 7 is a block diagram that illustrates the structure of the I/O address vector 44, which shows the entries 46, 48, 50, 52, 54, and 56 for an I/O address vector 44 after the object program 28 has been initialized, but before an OPEN operation has been performed for the associated file. When the first OPEN operation for the associated file is performed, a branch to this generic OPEN routine occurs.

Block 76 represents the entry into the generic OPEN routine, i.e., by a branch using the address 46 in the I/O address vector 44. Following block 76, block 78 is a decision block that determines whether the file-system 30, 32, or 34, or the file-system adapter 36, or some other interface for the specified file-system 30, 32, or 34 has been loaded. If not, control transfers to block 80; otherwise, control transfers to block 82. Block 80 loads the file-system 30, 32, or 34, and/or file-system adapter 36, or other interface. Following block 80, control transfers to block 82.

Block 82 represents the object program 28 filling in the OPEN slot 46 in the I/O address vector 44 to handle the OPEN routine for the specified file-system. This step replaces the initial entry 46 in the I/O address vector 44, which was used to branch to the generic OPEN routine. The addresses used to fill in the entries 48, 50, 52, 54, 56, and 58 in the I/O address vector 44 may be initialized by the compiler 22, or may be received from operating system 24 when the file-system is loaded, or may be determined by some other method.

Following block 82, block 84 represents the object program 28 branching to the OPEN routine indicated by the first entry 46 of the I/O address vector 44. After control is returned from the branched-to OPEN routine at block 84, control is transferred to block 86, which represents the object program 28 modifying the I/O address vector 44 by filling in the appropriate slots 46, 48, 50, 52, 54, and 56 to handle the valid input and operations for the specified file-system 30, 32, or 34. In block 86, the addresses of the CLOSE, READ, WRITE, REWRITE, START, and DELETE routines (or the associated error handling routines if necessary) for the specified file-system are entered into the corresponding entries 48, 50, 52, 54, 56, and 58 in the I/O address vector 44. Again, the addresses used to fill in the entries 46, 48, 50, 52, 54, 56, and 58 in the I/O address vector 44 may be initialized by the compiler 22, or may be received from operating system 24 when the file-system 30, 32, or 34 is loaded, or may be determined by some other method.

Those skilled in the art will recognize that other techniques could be used to update and modify the contents of the I/O address vector 44. For example, the routines in the file-system 30, 32, or 34 could update the I/O address vector 44, if the routines include instructions for such functions. In another example, the routines in the file-system adapter 36 could update the I/O address vector 44.

Those skilled in the art will also recognize that a certain amount of intelligence can be applied to any updates or modifications to the I/O address vector 44. For example, the I/O address vector 44 could be updated after an OPEN operation to reflect the type of operations to be performed on the file, e.g., read-only or write-only access would result in error handling routines being inserted into the appropriate entries 46, 48, 50, 52, 54, and 56 in the I/O address vector 44 for prohibited operations.

Furthermore, any number of routines may update the I/O address vector 44 according to the state of operations against the associated file. For example, a generic CLOSE routine or the CLOSE routine of the particular file-system 30, 32, or 34 could update the I/O address vector 44 with error handling routines and the generic OPEN routine to reflect the fact that the file has been closed, and that input and other operations (except for OPEN) can no longer be performed against the file. In another example, the READ routine could update the I/O address vector 44 with an error handling routine in the READ entry 48 of the I/O address vector 44 to reflect the fact that an end-of-file has occurred against the file. Those skilled in the art will recognize that any number of such events could result in any number of different modifications to the I/O address vector 44.

After the I/O address vector 44 is updated at block 86, control transfers to block 88, which returns from the generic OPEN routine.

The above functions performed using I/O address vector 44 allow for large amounts of flexibility for the user. For example, the object program 28 can access different file-systems without recompilation. Additional file-system support can be added at any time by simply writing a file-system adapter 36 and setting an environment variable to use the associated file-system.

CONCLUSION

This concludes the description of the preferred embodiment of the invention. The following describes some alternative embodiments for accomplishing the present invention.

For example, any type of computer, such as a mainframe, minicomputer, work station or personal computer, could be used with the present invention.

In addition, any software program adhering (either partially or entirely) to the COBOL language standard could benefit from the present invention. Moreover, other programming languages may benefit from the techniques disclosed herein.

In summary, the present invention discloses a method, apparatus, and article of manufacture for supporting multiple file-systems in COBOL file input/output (I/O) operations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of programming a computer, comprising the steps of:

(a) receiving a series of programming language statements comprising a source program into a memory of the computer, wherein at least one of the received statements includes a file-system identifier that permits selection of a file system for performing input and output operations in the source program and the file-system identifier is selected from a group comprising a literal, an environment variable, and a data name; and (b) compiling the source program into an object program in the memory of the computer, wherein the object program includes instructions for performing the input and output operations according to the file-system identifier that permits the selection of the file system, and wherein an I/O address vector is created for the object program, the I/O address vector comprising a list of addresses, each of the addresses representing a verb in the source program corresponding to one of the input and output operations, each of the addresses being assigned at the executing step, and each of the addresses corresponding to functions that perform the input and output operations associated with the represented verb.

2. The method of claim 1 above, wherein the literal comprises a file system name.

3. The method of claim 1 above, wherein the environment variable stores a file system name therein.

4. The method of claim 3 above, further comprising the step of executing the object program in the memory of the computer, further comprising the steps of specifying the file system name stored in the environment variable in conjunction with the executing step and performing the input and output operations according to the file system name stored in the environment variable.

5. The method of claim 1 above, wherein the data name stores a file name therein.

6. The method of claim 5 above, further comprising the step of executing the object program in the memory of the computer, further comprising the steps of storing the file name in the data name in conjunction with the executing step, and performing the input and output operations according to a file system associated with the file name.

7. The method of claim 1 above, further comprising the step of coupling the object program to a specified one of a plurality of file-systems residing in the memory of the computer.

8. The method of claim 1 above, further comprising the step of executing a file-system adapter in the memory of the computer for interfacing between the object program and the file-system.

9. The method of claim 8 above, further comprising the step of dynamically loading the file-system adapter at the executing step according to the selection of the file-system.

10. The method of claim 1 above, wherein the addresses correspond to functions in a file system adapter executed by the computer that interface to the file system.

11. The method of claim 1 above, wherein the addresses correspond to functions in the file system that perform the input and output operations.

12. The method of claim 1 above, wherein the addresses correspond to functions executed by a computer that perform error handling for the input and output operations.

13. The method of claim 1 above, further comprising the step of filling in the addresses in the I/O address vector after a successful open operation has been performed using the specified file system.

14. A computer programming apparatus, comprising:

(a) a computer having a memory;

(b) means, performed by the computer, for receiving a series of programming language statements comprising a source program into the memory of the computer, wherein at least one of the received statements includes a file-system identifier that permits selection of a file system for performing input and output operations in the source program and the file-system identifier is selected from a group comprising a literal, an environment variable, and a data name;

(c) means, performed by the computer, for compiling the source program into an object program in the memory of the computer, wherein the object program includes instructions for performing the input and output operations according to the file-system identifier that permits the selection of the file system, and wherein an I/O address vector is created for the object program, the I/O address vector comprising a list of addresses, each of the addresses representing a verb in the source program corresponding to one of the input and output operations, each of the addresses being assigned at the executing step, and each of the addresses corresponding to functions that perform the input and output operations associated with the represented verb.

15. A program storage device, readable by a computer having a memory, tangibly embodying a program of instruction executable by the computer to perform the steps of:

(a) receiving a series of programming language statements comprising a source program into the memory of the computer, wherein at least one of the received statements includes a file-system identifier that permits selection of a file system for performing input and output operations in the source program and the file-system identifier is selected from a group comprising a literal, an environment variable, and a data name; and (b) compiling the source program into an object program in the memory of the computer, wherein the object program includes instructions for performing the input and output operations according to the file-system identifier that permits the selection of the file system, and wherein an I/O address vector is created for the object program, the I/O address vector comprising a list of addresses, each of the addresses representing a verb in the source program corresponding to one of the input and output operations, each of the addresses being assigned at the executing step, and each of the addresses corresponding to functions that perform the input and output operations associated with the represented verb.

16. The apparatus of claim 14 above, wherein the literal comprises a file system name.

17. The apparatus of claim 14 above, wherein the environment variable stores a file system name therein.

18. The apparatus of claim 17 above, further comprising the means for executing the object program in the memory of the computer, further comprising the means for specifying the file system name stored in the environment variable in conjunction with the executing means and performing the input and output operations according to the file system name stored in the environment variable.

19. The apparatus of claim 14 above, wherein the data name stores a file name therein.

20. The apparatus of claim 19 above, further comprising the means for executing the object program in the memory of the computer, further comprising the means for storing the file name in the data name in conjunction with the executing means, and performing the input and output operations according to a file system associated with the file name.

21. The apparatus of claim 14 above, further comprising the means for coupling the object program to a specified one of a plurality of file systems residing in the memory of the computer.

22. The apparatus of claim 14 above, further comprising the means for executing a file system adapter in the memory of the computer for interfacing between the object program and the file system.

23. The apparatus of claim 22 above, further comprising the means for dynamically loading the file system adapter at the executing means according to the selection of the file system.

24. The apparatus of claim 14 above, wherein the addresses correspond to functions in a file system adapter executed by the computer that interface to the file system.

25. The apparatus of claim 14 above, wherein the addresses correspond to functions in the file system that perform the input and output operations.

26. The apparatus of claim 14 above, wherein the addresses correspond to functions executed by a computer that perform error handling for the input and output operations.

27. The apparatus of claim 14 above, further comprising the means for filling in the addresses in the I/O address vector after a successful open operation has been performed using the specified file system.

28. The programmable storage device of claim 15 above, wherein the literal comprises a file system name.

29. The programmable storage device of claim 15 above, wherein the environment variable stores a file system name therein.

30. The programmable storage device of claim 29 above, further comprising the step of executing the object program in the memory of the computer, further comprising the steps of specifying the file system name stored in the environment variable in conjunction with the executing step and performing the input and output operations according to the file system name stored in the environment variable.

31. The programmable storage device of claim 15 above, wherein the data name stores a file name therein.

32. The programmable storage device of claim 31 above, further comprising the step of executing the object program in the memory of the computer, further comprising the steps of storing the file name in the data name in conjunction with the executing step, and performing the input and output operations according to a file system associated with the file name.

33. The programmable storage device of claim 15 above, further comprising the step of coupling the object program to a specified one of a plurality of file systems residing in the memory of the computer.

34. The programmable storage device of claim 15 above, further comprising the step of executing a file system adapter in the memory of the computer for interfacing between the object program and the file system.

35. The programmable storage device of claim 34 above, further comprising the step of dynamically loading the file system adapter at the executing step according to the selection of the file system.

36. The programmable storage device of claim 15 above, wherein the addresses correspond to functions in a file system adapter executed by the computer that interface to the file system.

37. The programmable storage device of claim 15 above, wherein the addresses correspond to functions in the file system that perform the input and output operations.

38. (Amended) The programmable storage device of claim 15 above, wherein the addresses correspond to functions executed by a computer that perform error handling for the input and output operations.

39. The programmable storage device of claim 15 above, further comprising the step of filling in the addresses in the I/O address vector after a successful open operation has been performed using the specified file system.

* * * * *